(12) United States Patent
Amitay

(10) Patent No.: US 9,367,896 B2
(45) Date of Patent: Jun. 14, 2016

(54) SYSTEM AND METHOD FOR SINGLE-FRAME BASED SUPER RESOLUTION INTERPOLATION FOR DIGITAL CAMERAS

(71) Applicant: Qualcomm Technologies, Inc., San Diego, CA (US)

(72) Inventor: Amichay Amitay, Hod-Hasharon (IL)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 14/839,696

(22) Filed: Aug. 28, 2015

(65) Prior Publication Data

US 2015/0371369 A1     Dec. 24, 2015

Related U.S. Application Data

(63) Continuation of application No. 13/921,712, filed on Jun. 19, 2013, now Pat. No. 9,154,698.

(51) Int. Cl.
*G06K 9/32*     (2006.01)
*G06T 3/40*     (2006.01)
*H04N 5/232*    (2006.01)
(Continued)

(52) U.S. Cl.
CPC ............... *G06T 3/4053* (2013.01); *G06K 9/46* (2013.01); *G06K 9/4604* (2013.01); *G06T 3/40* (2013.01); *G06T 3/403* (2013.01); *G06T 3/4007* (2013.01); *G06T 5/00* (2013.01); *H04N 5/23235* (2013.01); *G06K 2009/4666* (2013.01); *G09G 2340/045* (2013.01)

(58) Field of Classification Search
CPC ......... G06T 3/40; G06T 3/403; G06T 3/4007; G06T 3/4053; G06T 5/00; H04N 5/23235

USPC .................................................. 382/299–300
See application file for complete search history.

(56) References Cited

U.S. PATENT DOCUMENTS

| | | | | |
|---|---|---|---|---|
| 4,716,414 A | * | 12/1987 | Luttrell | G01S 13/89 342/179 |
| 6,295,392 B1 | * | 9/2001 | Gregory | G06T 3/4053 382/321 |
| 7,373,019 B2 | * | 5/2008 | Zomet | G06T 3/4053 382/299 |

(Continued)

OTHER PUBLICATIONS

International Search Report and Written Opinion—PCT/US2014/042899—ISA/EPO—Oct. 29, 2014.

*Primary Examiner* — Kanjibhai Patel
(74) *Attorney, Agent, or Firm* — Knobbe, Martens, Olson & Bear LLP

(57) ABSTRACT

A digital camera system for super resolution image processing is provided. The digital camera system includes a resolution enhancement module configured to receive at least a portion of an image, to increase the resolution of the received image, and to output a resolution enhanced image and an edge extraction module configured to receive the resolution enhanced image, to extract at least one edge of the resolution enhanced image, and to output the extracted at least one edge of the resolution enhanced image, the at least one edge being a set of contiguous pixels where an abrupt change in pixel values occur. The digital camera system also includes an edge enhancement module configured to receive the resolution enhanced image and the extracted at least one edge, and to combine the extracted at least one edge or a derivation of the extracted at least one edge with the resolution enhanced image.

33 Claims, 6 Drawing Sheets

(51) Int. Cl.
 *G06T 5/00* (2006.01)
 *G06K 9/46* (2006.01)

(56) References Cited

U.S. PATENT DOCUMENTS

| | | | |
|---|---|---|---|
| 7,613,363 B2 * | 11/2009 | Platt | G06T 3/4053 235/491 |
| 7,688,363 B2 | 3/2010 | Sato et al. | |
| 7,800,683 B2 * | 9/2010 | Zalevsky | G02B 27/46 348/335 |
| 7,983,503 B2 | 7/2011 | Vakrat et al. | |
| 8,150,197 B2 | 4/2012 | Hwang et al. | |
| 8,335,403 B2 | 12/2012 | Dai et al. | |
| 8,780,034 B2 | 7/2014 | Kimura | |
| 8,867,858 B2 | 10/2014 | Fattal et al. | |
| 9,154,698 B2 | 10/2015 | Amitay | |
| 2006/0290950 A1 | 12/2006 | Platt et al. | |
| 2007/0025447 A1 | 2/2007 | Kojokaro et al. | |
| 2010/0074548 A1 | 3/2010 | Pan et al. | |
| 2011/0242371 A1 | 10/2011 | Vakrat | |
| 2012/0314946 A1 | 12/2012 | Nomura et al. | |

* cited by examiner

SYSTEM AND METHOD FOR SINGLE-FRAME BASED SUPER RESOLUTION INTERPOLATION FOR DIGITAL CAMERAS

CROSS-REFERENCE TO RELATED APPLICATION(S)

This application claims the benefit of U.S. patent application Ser. No. 13/921,712, filed Jun. 19, 2013.

BACKGROUND

1. Technical Field

The present invention relates to systems and methods for single-frame based super resolution interpolation for digital cameras.

2. Discussion

Digital cameras use various systems to enable photographers to capture images of objects at long distances. Optical zoom systems use one or more zoom lenses that may be adjusted to narrow the field of visible radiation incident on the photo-detectors of the digital camera. The narrower field of visible radiation incident on the photo-detectors magnifies the captured image, albeit with a narrower field of view, without the introduction of significant image aberrations. In contrast, digital zoom systems process the image, or a subset of the image, to increase its resolution to create an effect similar to optical zoom (i.e., a magnified narrower field of view). Digital zoom systems, however, generally produce significant undesirable image aberrations relative to optical zoom systems. For example, digital zoom systems may introduce aliasing (i.e., jagged diagonal edges), blurring, and/or haloing into the image. The aberrations introduced during digital zoom process occur primarily at or around the edges of objects in the image.

SUMMARY OF THE INVENTION

In accordance with at least one aspect of the embodiments disclosed herein, it is recognized that the standard approach to digital zoom systems produces significant image aberrations including, but not limited to, aliasing, blurring, and/or haloing. To minimize the introduction of these image aberrations through digital zoom, systems and methods for single-frame based super resolution interpolation for digital cameras are provided. The systems and methods for super resolution digitally zooms images by increasing the resolution of the image, or any portion of the image, in addition to extracting and enhancing the edges of objects in the image. The edges of the image are enhanced through a plurality of edge preserving filters. These filters enable the extraction and enhancement of the edges in the image to increase the detail of digitally zoomed images.

According to one aspect, a digital camera system for super resolution image processing is provided. The digital camera system comprises a resolution enhancement module configured to receive at least a portion of an image, to increase the resolution of the received image, and to output a resolution enhanced image, an edge extraction module configured to receive the resolution enhanced image, to extract at least one edge of the resolution enhanced image, and to output the extracted at least one edge of the resolution enhanced image, the at least one edge being a set of contiguous pixels where an abrupt change in pixel values occur, and an edge enhancement module configured to receive the resolution enhanced image and the extracted at least one edge, and to combine the extracted at least one edge or a derivation of the extracted at least one edge with the resolution enhanced image.

According to one embodiment, the resolution enhancement module is further configured to increase the resolution of the received image at least in part by interpolating the received image. According to one embodiment, the resolution enhancement module is further configured to interpolate the received image consistent with a bicubic interpolation process. According to one embodiment, the edge extraction module is further configured to filter the resolution enhanced image through a first edge-preserving filter having a first strength and a second edge-preserving filter having a second strength. According to one embodiment, the strength of the first edge-preserving filter is configurable and wherein the edge extraction module is further configured to decrease the strength of the first edge preserving filter to increase a level of image detail or increase the strength of the first edge preserving filter to decrease the level of image detail. According to one embodiment, the first strength is less than the second strength and wherein the edge extraction module is further configured to subtract the resolution enhanced image filtered through the second edge preserving filter from the resolution enhanced image filtered through the first edge-preserving filter. According to one embodiment, the edge enhancement module is further configured to add the extracted at least one edge to the resolution enhanced image.

According to one embodiment, the resolution enhancement module is further configured to divide the received image into a plurality of subsections. According to one embodiment, the resolution enhancement module is further configured to increase the resolution of each of the subsections of the received image and wherein the edge extracting component is further configured to extract at least one edge of each subsection of the resolution enhanced image. According to one embodiment, the digital camera system further comprises a white noise module configured to add white noise to the resolution enhanced image.

According to one aspect, a method of super resolution image processing in a digital camera is provided. The method comprises increasing the resolution of a received image to obtain a resolution enhanced image, extracting at least one edge of the resolution enhanced image, the at least one edge being a set of contiguous pixels where an abrupt change in pixel values occur, and enhancing the at least one edge of the resolution enhanced image by combining the extracted at least one edge or a derivation of the extracted at least one edge with the resolution enhanced image.

According to one embodiment, the method further comprises increasing the resolution of the received image includes interpolating the received image. According to one embodiment, interpolating the received image includes interpolating the received image consistent with a bicubic interpolation process. According to one embodiment, extracting the at least one edge includes filtering the resolution enhanced image through a first edge preserving filter having a first strength and a second edge-preserving filter having a second strength. According to one embodiment, the strength of the first edge-preserving filter is configurable and extracting the at least one edge includes increasing the strength of the first edge-preserving filter to decrease a level of image detail or decreasing the strength of the first edge-preserving filter to increase a level of image detail. According to one embodiment, the first strength is less than the second strength and wherein extracting the at least one edge further includes subtracting the resolution enhanced image filtered through the second edge preserving filter from the resolution enhanced image filtered through the first edge-preserving filter. According to one embodiment, enhancing the at least one edge further includes adding the extracted at least one edge to the resolution enhanced image.

According to one embodiment, increasing the resolution of the received image includes dividing the received image into a plurality of received image subsections. According to one embodiment, increasing the resolution of the received image further includes increasing the resolution of each of the subsections of the received image to obtain a plurality of resolution enhanced image subsections and wherein enhancing the at least one edge includes enhancing at least one edge in each of the resolution enhanced image subsections. According to one embodiment, the method further comprises adding white noise to the resolution enhanced image.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the embodiments disclosed herein. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
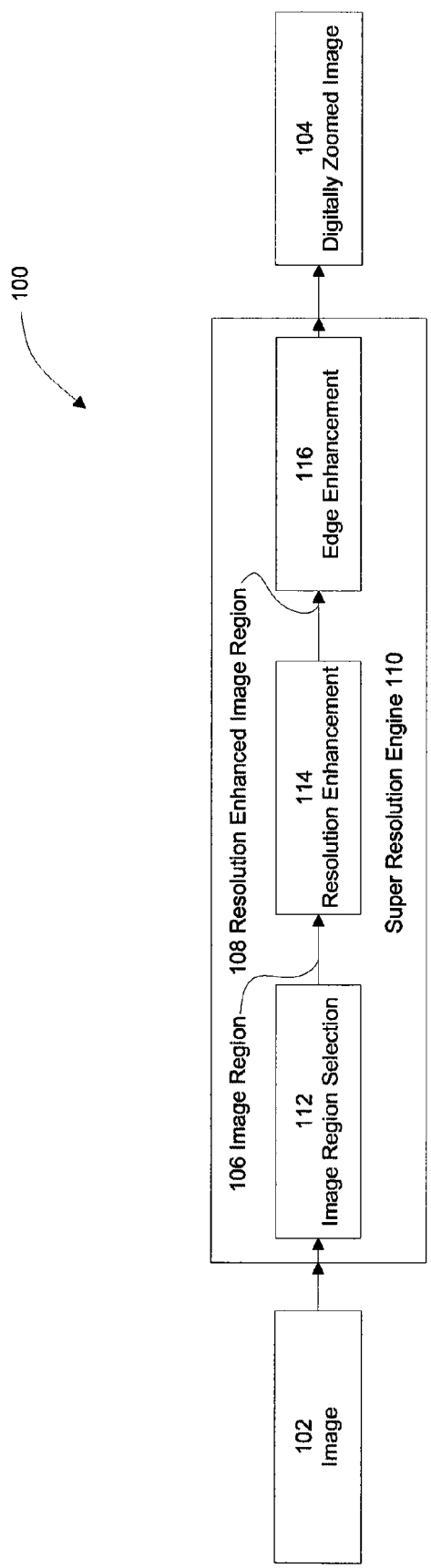
FIG. 1 illustrates a functional block diagram of a super resolution image processing system in accordance with the present invention.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Embodiments of the present invention relate to single-frame based super resolution interpolation for digital cameras. It should be appreciated that the term "digital camera" used herein includes, but is not limited to, dedicated cameras as well as camera functionality performed by any electronic device (e.g., mobile phones, personal digital assistants, etc.). In addition, the methods and systems described herein may be applied to a plurality of images arranged in a time sequence (e.g., a video stream). The use herein of the term "module" is interchangeable with the term "block" and is meant to include implementations of processes and/or functions in software, hardware, or a combination of software and hardware. In one embodiment, the single-frame based super resolution interpolation system and method digitally zoom an image, or any portion of the image, without producing significant image aberrations in the output digitally zoomed image. Digitally zooming an image causes significant aberrations particularly to the edges of objects in the image. For example, the edges in digitally zoomed images may appear jagged from aliasing. Accordingly, in some embodiments, the systems and methods provided improve the quality of the edges in the super resolution process to produce a high quality digitally zoomed image.

Super Resolution Image Processing System

FIG. 1 illustrates an example system for super resolution image processing. As shown, the super resolution image processing system 100 of FIG. 1 includes a super resolution engine 110 that receives an image 102 and performs image processing on the received image to produce a digitally zoomed image 104. The super resolution engine 110 includes multiple functional blocks or modules including an image region selection block 112 that selects at least a portion of the image 102 and provides an image region 106, a resolution enhancement block 114 that enhances the resolution of the portion of the image and provides a resolution enhanced image region 108, and an edge enhancement block 116 that enhances edges in the enhanced image region and provides the digitally zoomed image 104.

The input to the super resolution engine 110 is an image 102. In one embodiment, the image comprises a plurality of pixels represented by one or more two dimensional matrices. Each element in the matrices represents information regarding a specific pixel location in the image. For example, the location (10, 10) in a first, second, and third two dimensional matrix may represent data associated with a pixel at the (10, 10) location in the image. Each of the one or more matrices may represent a set of intensities associated with the image in a given dimension. In one embodiment, each pixel in the image is represented by a three-dimensional vector. In this embodiment, the image is represented by a first two dimensional matrix for the first dimension, a second two dimensional matrix for the second dimension, and a third two dimensional matrix for the third dimension. It is appreciated that each pixel may be represented by any number of dimensions or any number of matrices.

In some embodiments, the image is represented by three two dimensional matrices consistent with a YUV color space. The YUV color space is composed of three distinct components Y, U, and V where each two dimensional matrix represents a specific component of the YUV space. The Y component is the luminance component that relates to the brightness of the image. The U and V components are chrominance components that relate to the specific color of the image. Each pixel in an image is represented by a vector in the YUV color space (i.e., some combination of the Y, U, and V components). In some embodiments, the image is represented by three two dimensional matrices consistent with a RGB color space. The RGB color space is also composed of three distinct components R, G, and B where each two dimensional matrix represents a specific component of the RGB space. All three of the distinct components (i.e., R, G, and B components) are all chrominance components that relate to the specific color of the image. It is appreciated that the image may be represented in any color space and is not limited to the YUV or RGB color spaces.

The image 102 is input into the super resolution engine 110. The super resolution engine 110 executes a variety of processes to output a digitally zoomed image 104. In one embodiment, the digitally zoomed image is a magnified image region 106. The image region 106 may include the entire image or any subset of the image 102. It is appreciated that the processes performed by the super resolution engine 110 do not need to be performed on all of the dimensions of each pixel of the image region 106. In some embodiments, the pixels in the image region 106 are represented by a vector in the YUV color space. In these embodiments, the processes of the super resolution engine 110 may be performed on any combination dimensions in the YUV color space. For example, in one embodiment the processes of the super resolution engine may be performed only on the Y component (i.e., the luminance component) of the image region 106 pixels. In this embodiment, interpolation processes (e.g., bicubic interpolation) may be performed on the U and V components (i.e., the chrominance components) to obtain a digitally zoomed image 104.

The various processes performed by the super resolution engine 110 to generate the digitally zoomed image 104 include the processes performed by the image region selection block 112, the resolution enhancement block 114, and the edge enhancement block 116. In various embodiments, the image region selection block 112 crops the image as appropriate to select an image region 106 of the input image 102 to be digitally zoomed. It is appreciated that the image region selection block 112 is an optional block. For example, the super resolution engine 110 may digitally zoom the entire image 102. In other embodiments, the super resolution engine 110 self-selects the entire image 102 or any subset of the image 102 to digitally zoom.

In some embodiments, the resolution enhancement block 114 increases the resolution of the image region 106 to produce an enhanced resolution image region 108. In one embodiment, the resolution of the image region 106 is increased through interpolation of the image region 106. Interpolation is a method of creating new data points between a set of known discrete data points. In this embodiment, the known data points are the known pixel values (e.g., the Y, U, and/or V channel intensity values for a given pixel). The new data points, in this embodiment, are the pixels created through interpolation. It is appreciated that the interpolation may be preceded by one or more acts to smooth the edges of the image region 106 to improve the quality of the edges in the resolution enhanced image region 108. The edge smoothing sharpens the image by shortening the transitions between color and/or brightness changes (i.e., object edges). A visual representation of an edge smoothing process is illustrated in the edge smoothing process diagrams 600 with reference to FIG. 6. The super resolution engine 110 may proceed to the edge enhancement block 116.

In one embodiment, the edge enhancement block 116 enhances the edges of objects in the image. The interpolation performed in the resolution enhancement block 114 may create a smoothed image that lacks sharp details. Accordingly, the edge enhancement block 116 is capable of extracting and enhancing the edges of the resolution enhanced image region 108. In one embodiment, the edge enhancement block 116 extracts the edges of the resolution enhanced image region 108. The extracted edges may then be added to the resolution enhanced image region 108 to increase the edge detail.

It is appreciated that any combination of the super resolution image processing functional blocks (e.g., the image region selection block 112, the resolution enhancement block 114, and the edge enhancement block 116) may perform operations in parallel. In one embodiment, the input image 102 may be divided into a plurality of subsections. Each subsection of the image 102 may be processed individually in parallel. The processed subsections may be combined to form the digitally zoomed image 104. Implementing the super resolution image processing in parallel increases the speed in which the digitally zoomed image 104 can be provided.

It is appreciated that the super resolution engine 110 may take a variety of forms dependent upon the specific application. In some embodiments, the super resolution engine 110 comprises a series of instructions performed by an image processing system. In other embodiments, one or more of the blocks or modules 112, 114, and 116 may be implemented in hardware, such as an application-specific integrated circuit (ASIC), system on a chip (SoC), state machine, or a dedicated processor.

Example Image Processing System

Figure 2:
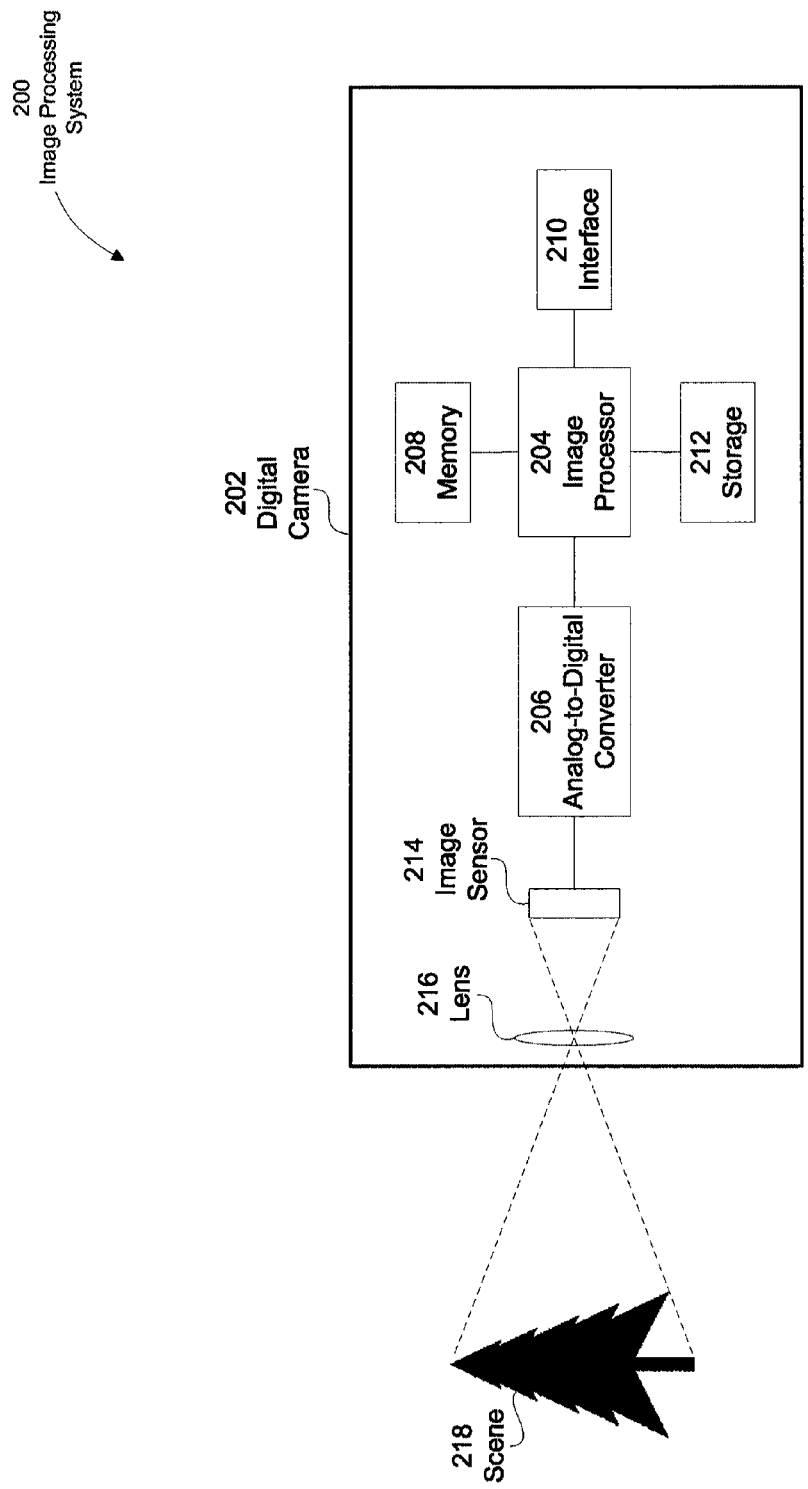
FIG. 2 illustrates an image processing system in which super resolution image processing may be performed.

FIG. 2 illustrates an example image processing system 200 in which super resolution processing can be performed. As shown, the image processing system 200 of FIG. 2 includes a digital camera 202 that is configured to provide a digital image of a scene 218. The digital camera 202 includes an image processor 204, an analog-to-digital converter 206, a memory 208, an interface 210, storage 212, an image sensor 214, and a lens 216.

As illustrated in FIG. 2, the digital camera 202 includes the image processor 204 to implement at least some of the aspects, functions and processes disclosed herein. The image processor 204 performs a series of instructions that result in manipulated data. The image processor 204 may be any type of processor, multiprocessor or controller. Some exemplary processors include processors with ARM11 or ARM9 architectures. The image processor 204 is connected to other system components, including one or more memory devices 208.

The memory 208 stores programs and data during operation of the digital camera 202. Thus, the memory 208 may be a relatively high performance, volatile, random access memory such as a dynamic random access memory ("DRAM") or static memory ("SRAM"). However, the memory 208 may include any device for storing data, such as a flash memory or other non-volatile storage devices. Various examples may organize the memory 208 into particularized and, in some cases, unique structures to perform the functions disclosed herein. These data structures may be sized and organized to store values for particular data and types of data.

The data storage element 212 includes a writeable nonvolatile, or non-transitory, data storage medium in which instructions are stored that define a program or other object that is executed by the image processor 204. The data storage element 212 also may include information that is recorded, on or in, the medium, and that is processed by the image processor 204 during execution of the program. More specifically, the information may be stored in one or more data structures specifically configured to conserve storage space or increase data exchange performance. The instructions may be persistently stored as encoded signals, and the instructions may cause the image processor 204 to perform any of the functions described herein. The medium may, for example, be optical disk, magnetic disk or flash memory, among others. In operation, the image processor 204 or some other controller causes data to be read from the nonvolatile recording medium into another memory, such as the memory 208, that allows for faster access to the information by the image processor 204 than does the storage medium included in the data storage element 212. The memory may be located in the data storage element 212 or in the memory 208, however, the image processor 204 manipulates the data within the memory, and then copies the data to the storage medium associated with the data storage element 212 after processing is completed. A variety of components may manage data movement between the storage medium and other memory elements and examples are not limited to particular data management components. Further, examples are not limited to a particular memory system or data storage system.

The digital camera 202 also includes one or more interface devices 210 such as input devices, output devices and combination input/output devices. Interface devices may receive input or provide output. More particularly, output devices may render information for external presentation. Input devices may accept information from external sources. Examples of interface devices include microphones, touch screens, display screens, speakers, buttons, etc. Interface devices allow the digital camera 202 to exchange information and to communicate with external entities, such as users and other systems.

Although the digital camera 202 is shown by way of example as one type of digital camera upon which various aspects and functions may be practiced, aspects and functions are not limited to being implemented on the digital camera 202 as shown in FIG. 2. Various aspects and functions may be practiced on digital cameras having a different architectures or components than that shown in FIG. 2. For instance, the digital camera 202 may include specially programmed, special-purpose hardware, such as an application-specific integrated circuit ("ASIC") or a system on a chip ("SoC") tailored to perform a particular operation disclosed herein. It is appreciated that the digital camera 202 may be incorporated into another electronic device (e.g., mobile phone, personal digital assistant etc.) and is not limited to dedicated digital cameras.

The lens 216 includes one or more lenses that focus the visible radiation on the image sensor 214. It is appreciated that the lens 216 is not limited to a single physical lens as illustrated in FIG. 2. In some embodiments, the lens 216 includes a plurality of zoom lenses that enable optical zoom. Optical zoom may be accomplished by narrowing the field of view of the visible radiation incident on the image sensor 214.

The image sensor 214 may include a two dimensional area of sensors (e.g., photodetectors) that are sensitive to light. In some embodiments, the photo-detectors of the image sensor 214, in some embodiments, can detect the intensity of the visible radiation in one of two or more individual color and/or brightness components. For example, the output of the photo-detectors may include values consistent with a YUV or RGB color space. It is appreciated that other color spaces may be employed by the image sensor 214 to represent the captured image.

In various embodiments, the image sensor 214 outputs an analog signal proportional to the intensity and/or color of visible radiation striking the photo-detectors of the image sensor 214. The analog signal output by the image sensor 214 may be converted to digital data by the analog-to-digital converter 206 for processing by the image processor 204. In some embodiments, the functionality of the analog-to-digital converter 206 is integrated with the image sensor 214. The image processor 204 may perform variety of processes to the captured image. These processes may include, but are not limited to, one or more super resolution processes to digitally zoom the captured image.

Super Resolution Image Processing Implementations

Figure 3:
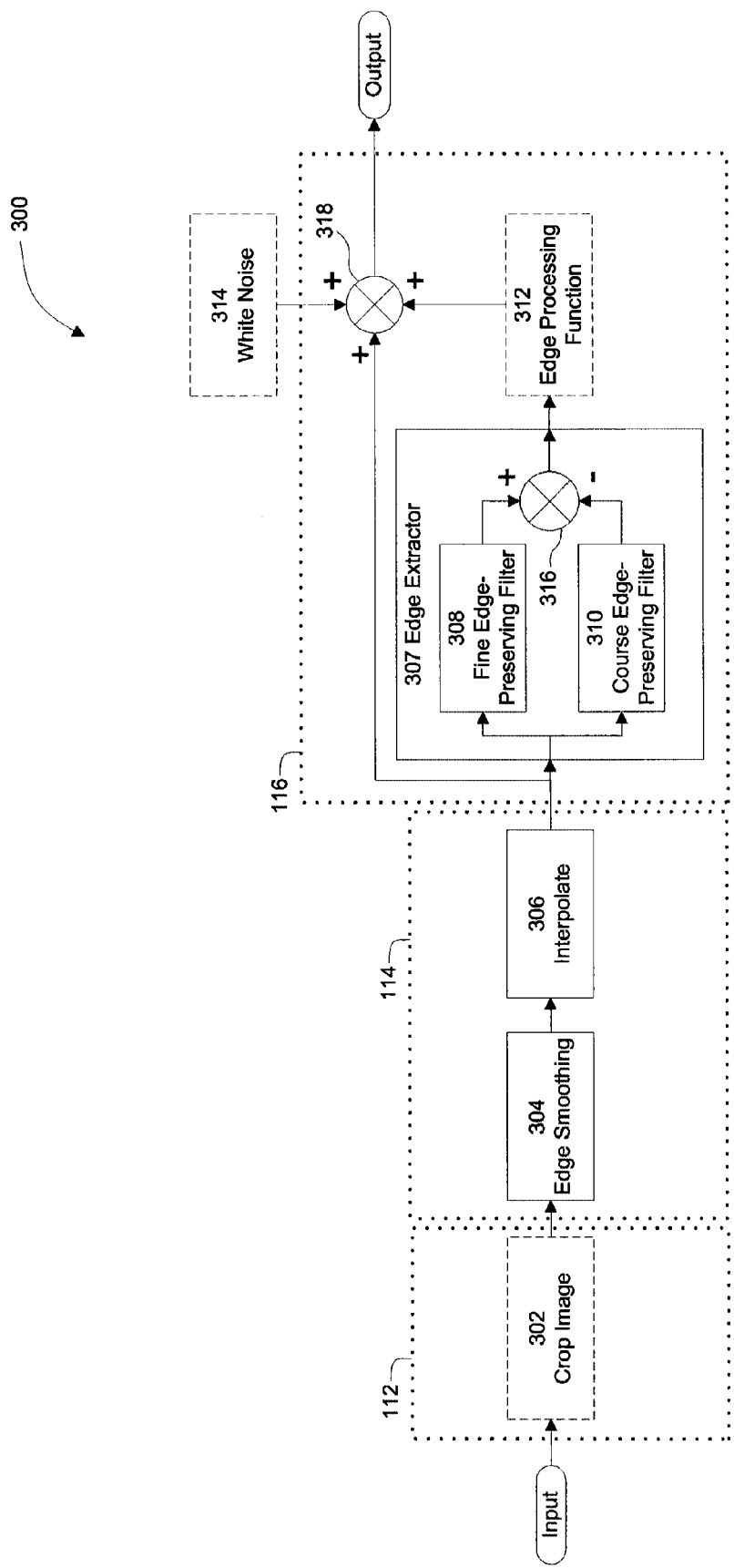
FIG. 3 illustrates a more detailed functional block diagram of a super resolution image processing system for super resolution image processing in accordance with an embodiment of the present invention.

FIG. 3 illustrates a more detailed functional block diagram of the super resolution image processing system 100 including an image region selection block 112, a resolution enhancement block 114, and an edge enhancement block 116 in accordance with FIG. 1. As shown in FIG. 3, the super resolution image processing system 300 of FIG. 3 includes a crop image block 302, an edge smoothing block 304, an interpolate block 306, an edge extraction block 307, a fine edge-preserving filter block 308, a course edge-preserving filter block 310, an edge processing function block 312, a white noise block 314, a difference block 316, and a sum block 318. It is appreciated that any block drawn in dashed lines is an optional block. In addition, large boxes drawn in dotted lines show the relation between the super resolution image processing system 100 including the image region selection block 112, the resolution enhancement block 114, and the edge enhancement block 116 described with reference to FIG. 1 and the functional blocks shown in FIG. 3.

The crop image block 302 illustrates one possible implementation of the image region selection block 112. The crop image block 302 crops the image as appropriate to feed into the later functional blocks of the super resolution image processing system 300. In one embodiment, the crop image block 302 may crop the image responsive to input received through an interface from an external entity (e.g., interface 210 of the digital camera 202). In another embodiment, the crop image block 302 self-selects an image region 106 and crops the image 102 as appropriate. It is appreciated that the crop image block 302 is an optional block.

The optional image region selection block 112 is followed by the resolution enhancement block 114. The edge smoothing block 304 and the interpolate block 306 illustrate one possible implementation of the resolution enhancement block 114. In one embodiment, the edge smoothing block 304 smoothes the edges of objects in the image region 106. The edge of an object in an image may be characterized by a set of contiguous pixels where an abrupt change of intensity values occurs.

Figure 6:
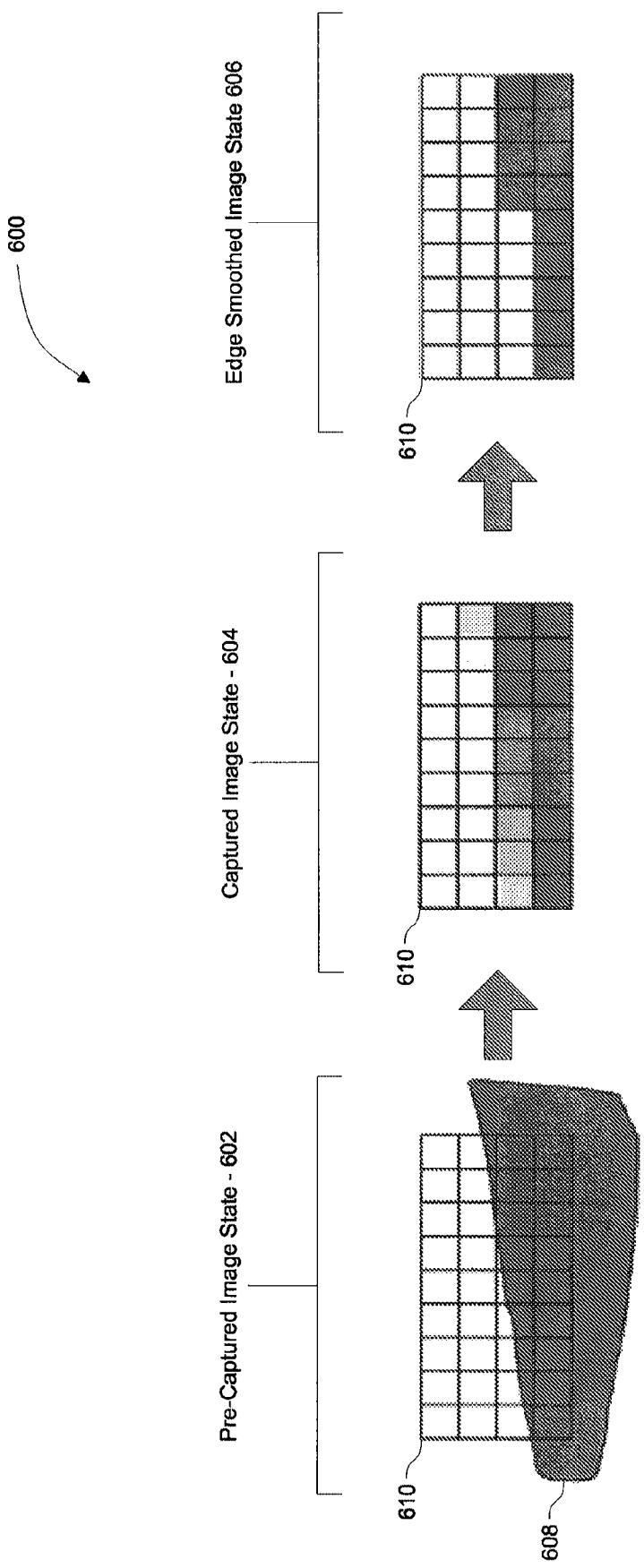
FIG. 6 illustrates example diagrams of an edge smoothing process applied to a pixel matrix.

A visual representation of an edge smoothing process is illustrated by the edge smoothing process diagrams 600 with reference to FIG. 6. As shown in FIG. 6, the edge smoothing process diagrams 600 of FIG. 6 includes an object 608 within the field of view of a pixel matrix 610 that proceeds through a pre-captured image state 602, a captured image state 604, and an edge smoothed image state 606.

The pre-captured image state 602 illustrates an object 608 in the field of view of a pixel matrix 610. The edges of the object 608 cross through a plurality of pixels in the pixel matrix. The captured image state 604 of the pixel matrix 610 illustrates the effect of capturing an image of an object with edges crossing through multiple pixels. The third row of pixels from the top illustrates the edge blurring effect that occurs when an image is captured by a digital camera (e.g., digital camera 202). The pixels in the third row from the top get darker moving from left to right proportional to the area of the pixel that was covered by the object. The edge smoothing process that occurs between the image captured state 604 and the edge smoothed image state 606 sharpens the image by eliminating some or all of the transition pixels. In this illustration, the elimination of transition pixels is shown in the third row of the pixel matrix 610 in the edge smoothed image state 606. The degree of the transition (i.e., the amount of transition pixels remaining in the image region) may be controlled with a strength parameter associated with the edge smoothing filter applied.

Referring back to FIG. 3, the edge smoothing block 304 may be any pertinent edge smoothing or edge-preserving filter. In one embodiment, the edge smoothing filter is the edge preserving noise reduction filter described in co-pending U.S. application Ser. No. 13/160,775, titled ADVANCED NOISE REDUCTION IN DIGITAL CAMERAS, filed Jun. 15, 2011 (hereinafter the "'775 application"), which is incorporated by reference herein in its entirety. It should be appreciated that embodiments of the present invention are not limited to any particular type of edge smoothing or edge preserving filter, as various types of filters may be used.

The edge smoothing block is followed by the interpolate block 306. The interpolate block may compute a new pixel matrix at a higher resolution based on the input pixel matrix. In one embodiment, the interpolation block analyzes a closest set of pixels from the input image pixel matrix to determine corresponding new pixel values in the new pixel matrix. The specific process that is used to perform the interpolation may be consistent with a variety of methods including, but not limited to, bicubic interpolation, bilinear interpolation, nearest neighbor interpolation, spline interpolation, or sinc interpolation.

The resolution enhancement block 114 is followed by the edge enhancement block 116. The edge enhancement block 116, in some embodiments, is illustrated by the edge extraction block 307, the fine edge-preserving filter 308, the course edge-preserving filter 310, the edge processing function block 312, the difference block 316, and the sum block 318. In one embodiment, the fine edge-preserving filter 308 and the course edge-preserving filter 310 are edge sensitive filters of different strengths. In this embodiment, the fine edge preserving filter 308 is a weaker edge filter than the course edge-preserving filter 310. It is appreciated that the fine edge-preserving filter 308 may or may not be the same type of edge preserving filter as the course edge-preserving filter 310. The output of the course edge preserving filter 310 is subtracted from the output of the fine edge preserving filter 308 in difference block 316. The output of the difference block 316 contains only the edges of the resolution enhanced image region 108. The combination of the fine edge-preserving filter 308, the course edge-preserving filter 310 and the difference block 318 may thus form the edge extraction block 307. It is appreciated that the specific method to obtain the edges of the resolution enhanced image region 108 may be altered. For example, a plurality of edge preserving filters of various strengths may be combined in a linear fashion to generate a similar resultant output (i.e., the edges of the image). In addition, a single filter that targets the edges of the images may also be used. In other embodiments, the fine edge-preserving filter 308 and the course edge-preserving filter 310 can be the edge preserving noise reduction filters described in the '775 application. It is appreciated that any combination of the edge-preserving filters may be selectable, for example, based on input or preferences received from a user of the system.

The image edges from the difference block 316 may then be processed by the edge processing function block 312. The edge processing function block may be any function, linear or otherwise, that enhances the resolution enhanced image 106 edges. The edge processing function block may be implemented, for example, with a lookup table (LUT). In one embodiment, the edge processing function block 312 is a multiplier that amplifies or attenuates the edges. In this embodiment, the edge processing function block 312 may receive input from a user through a user interface. For example, the user interface may have configurable settings regarding the level of detail in the digitally zoomed image 104. The edge processing function block 312 may increase the multiplier responsive to a higher detail level setting or decrease the multiplier responsive to a lower detail level setting. It is appreciated that the edge processing function block 312 is an optional function. The output of the difference block 312 may be directly connected to the summation block 318.

The summation block 318 combines the resolution enhanced image region 106 with the edges of the resolution enhanced image region 106 to form a digitally zoomed image 104. The addition of the edges of the resolution enhanced image region 106 to the resolution enhanced image region 106 increases the detail of the edges that may have undergone some level of distortion in the resolution enhancement block 114.

The summation block 318 may also combine white noise from the white noise block 314 with the digitally zoomed image 104. The addition of white noise to the digitally zoomed image 104 gives the appearance of high resolution noise in the digitally zoomed image 104 rather than amplified low resolution noise. The intensity of white noise added may vary. For example, in one embodiment the amount of white noise added to the image is computed responsive to the camera settings when the image was taken (e.g., ISO, aperture, or shutter speed). It is appreciated that the addition of white noise, and consequently the white noise block 314, is optional. In addition, the white noise from the white noise module may be combined with the resolution enhanced image region 106.

Having described at least one implementation of the super resolution image processing system, it is appreciated that the specific implementations described may be altered to generate the same result (i.e., a digitally zoomed image without significant image aberrations). Other example implementations of the super resolution image processing systems are illustrated by functional block diagrams of super resolution image processing systems 400 and 500 with reference to FIGS. 4 and 5 respectively.

Figure 4:
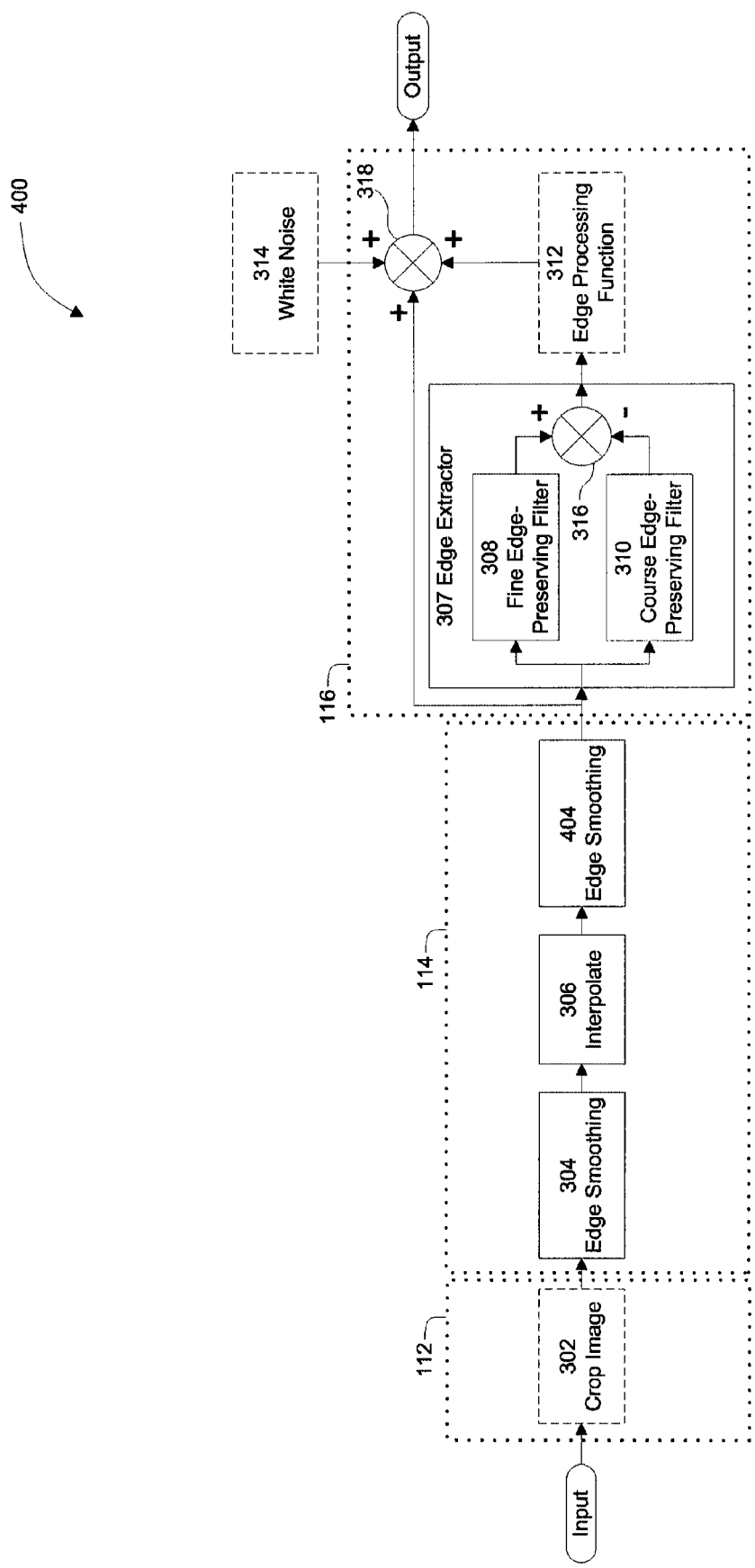
FIG. 4 illustrates a more detailed functional block diagram of a super resolution image processing system for super resolution image processing in accordance with another embodiment of the present invention.

FIG. 4 illustrates an alternative functional block diagram of the super resolution image processing system 100 including an image region selection block 112, a resolution enhancement block 114, and an edge enhancement block 116 in accordance with FIG. 1. As shown in FIG. 4, the super resolution image processing system 400 of FIG. 4 includes a crop image block 302, edge smoothing blocks 304 and 404, an interpolation block 306, an edge extraction block 307, a fine edge-preserving filter block 308, a course edge-preserving filter block 310, an edge processing function block 312, a white noise block 314, a difference block 316, and a sum block 318. It is appreciated that any block drawn in dashed lines is an optional block. In addition, large boxes drawn in dotted lines show the relation between the processes described with reference to FIG. 1 and the functional blocks shown in FIG. 4.

The image region selection block 112 and the edge enhancement block 116 implemented by the crop image block 302, the edge extraction block 307, the fine edge preserving filter 308, the course edge-preserving filter 310, the edge processing function block 312, the difference block 316, and the sum block 318 are similar to that described with reference FIG. 3 above. The resolution enhancement block 114 that is implemented in the embodiment depicted in FIG. 4 by the edge smoothing blocks 304 and 404 in addition to the interpolate block 306 is a variation of the resolution enhancement block 116 described with reference to FIG. 3. The additional edge smoothing block 404 improves the quality of the edges in the resolution enhanced image 106 and consequently the final digitally zoomed image 104. The additional cost of the additional edge smoothing block 404 is the additional computation required to perform the additional edge smoothing. It is appreciated that the filter used in the edge smoothing block 404 may, or may not, be constructed to be identical to the edge filter in the edge smoothing block 304. In addition, the summation block 318 may also combine white noise from the white noise block 314 with the digitally zoomed image 104 as described with reference to FIG. 3.

Figure 5:
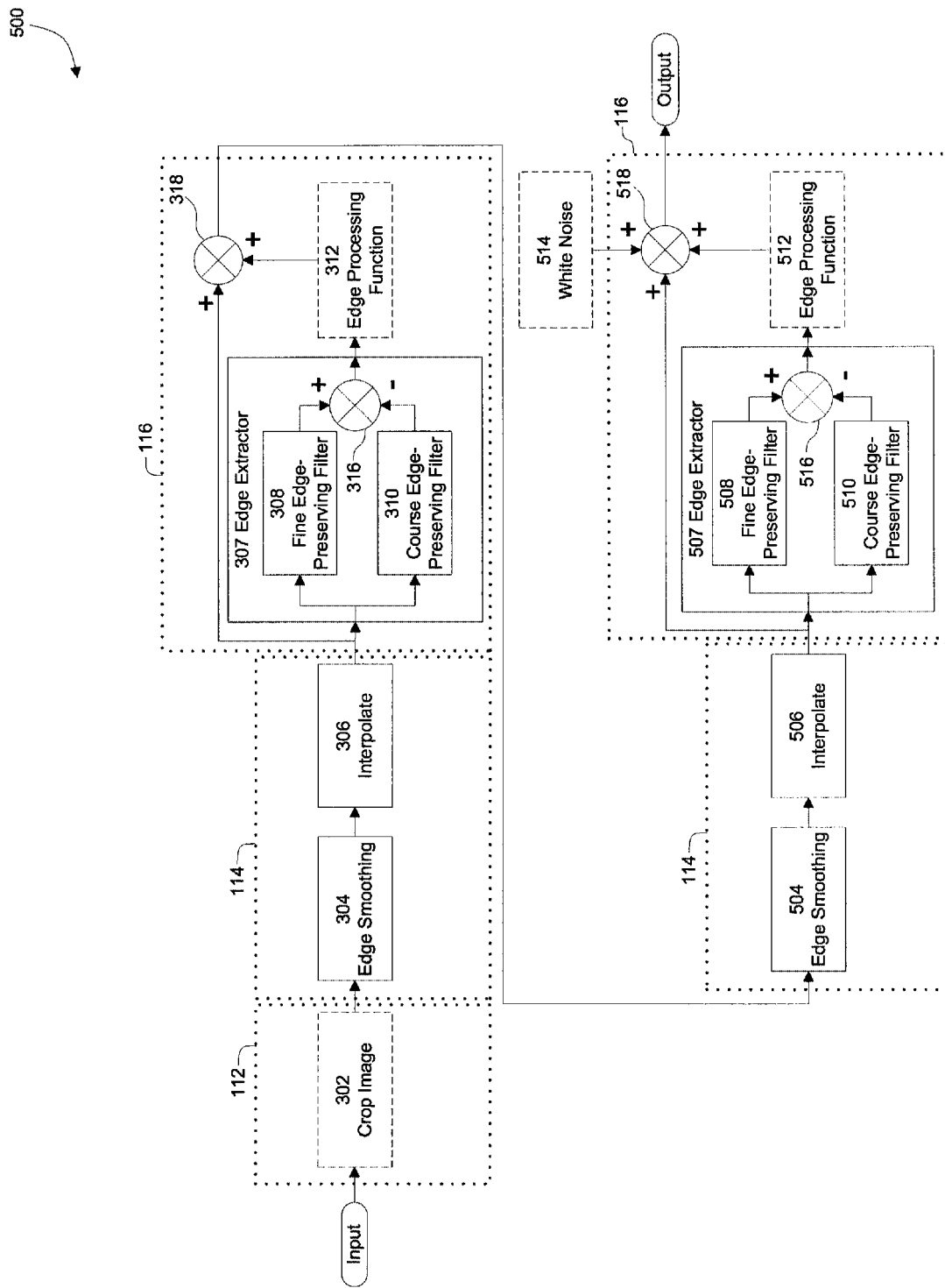
FIG. 5 illustrates a more detailed functional block diagram of a super resolution image processing system for super resolution image processing in accordance with yet another embodiment of the present invention.

FIG. 5 illustrates a further alternative functional block diagram of the super resolution image processing system 100 including an image region selection block 112, are solution enhancement block 114, and an edge enhancement block 116 in accordance with FIG. 1. As shown in FIG. 5, the super resolution image processing system 500 of FIG. 5 includes a crop image block 302, edge smoothing blocks 304 and 504, interpolation blocks 306 and 406, edge extraction blocks 307 and 507, fine edge-preserving filter blocks 308 and 508, course edge-preserving filter blocks 310 and 410, edge processing function blocks 312 and 512, white noise block 514, difference blocks 316 and 516, and sum blocks 318 and 518. It is appreciated that any block drawn in dashed lines is an optional block. In addition, large boxes drawn in dotted lines show the relation between the processes described with reference to FIG. 1 and the functional blocks shown in FIG. 5.

The image region selection block 112, resolution enhancement block 114, and the edge enhancement block 116 are similar to that described with reference FIG. 3 above. The implementation of the super resolution image processing system in FIG. 5 shows multiple iterations of the resolution enhancement block 114 and the edge enhancement block 116. Multiple iterations of the resolution enhancement block 114 and the edge enhancement block 116 processes increase the detail in the digitally zoomed image 104 at the cost of additional computation. It is appreciated that the resolution enhancement block 114 and the edge enhancement block 116 may be repeated any number of times to achieve the desired level of detail in the digitally zoomed image 104. In one embodiment, the image 102 may need to be digitally zoomed substantially. In this embodiment, the first iteration of the resolution enhancement block 114 and the edge enhancement block 116 may only digitally zoom the image 102 a fraction of the required total digital zoom. The second iteration of the resolution enhancement block 114 and the edge enhancement block 116 may increase the resolution to the desired final digitally zoomed image 104. It should be appreciated that an additional edge smoothing block (e.g., edge smoothing block 404 in FIG. 4) can be added to the first iteration, the second iteration, or both. In addition, the summation block 518 may also combine white noise from the white noise block 514 with the digitally zoomed image 104 after both iterations of the super resolution processes.

It is appreciated that the super resolution image processing system 100 including the image region selection block 112, the resolution enhancement block 114, and the edge enhancement block 116 may be performed on any combination of the chrominance and/or luminance channels of the image 102. For example, in one embodiment the image 102 is in the YUV color space and the super resolution image processing system 100 including the image region selection block 112, the resolution enhancement block 114, and the edge enhancement block 116 are only applied to the luminance channel (i.e., Y channel) of the image 102. In this embodiment, the U and V channels undergo only interpolation (e.g., bicubic interpolation). This embodiment is of lower computational complexity when compared to performing the super resolution processes on all three channels. The loss of quality is minimal, in this embodiment, because the human eye is substantially more sensitive to brightness than color. The sensitivity of the photoreceptors that perceive brightness (i.e., rods of the human eye) are more numerous and more sensitive than photoreceptors that perceive color (i.e., cones of the human eye).

Having thus described several aspects of at least one example, it is to be appreciated various alterations, modification, and improvements will readily occur to those skilled in the art. For example, it should be appreciated that specific functional blocks in FIGS. 3-5 may be altered. For example depending on the requirements, some implementations may use a single filter to isolate the edges of the image rather than computing the difference between two edge-preserving filters of different strengths. Moreover, it should be appreciated that in certain environments any linear combination of edge-preserving filters may be used to fine-tune edge enhancement process. Such alterations, modifications, and improvements are intended to be part of this disclosure, and are intended to be within the scope of the embodiments disclosed herein. Accordingly, the foregoing description and drawings are by way of example only.

What is claimed is:
1. A device for image processing, comprising:
a memory circuit configured to store an image;
an image processor circuit in communication with the memory circuit, the image processor circuit configured to:
receive at least a portion of the image from the memory circuit;

smooth at least one edge of the portion of the image via replacing one or both of a color value and a brightness value of at least one transition pixel along the at least one edge;

increase a resolution of the smoothed portion to form an enhanced image;

extract at least one edge of the enhanced image; and combine the extracted at least one edge or a derivation of the extracted at least one edge with the enhanced image.

2. The device of claim 1, wherein the image processor circuit is further configured to add white noise to the enhanced image.

3. The device of claim 1, wherein the image processor circuit is configured to increase the resolution of the smoothed portion via at least one of a bicubic interpolation, a bilinear interpolation, a nearest neighbor interpolation, a spline interpolation, and a sinc interpolation.

4. The device of claim 1, wherein the image processor circuit is further configured to filter the enhanced image through a first edge-preserving filter having a first strength and a second edge-preserving filter having a second strength.

5. The device of claim 4, wherein the image processor circuit is further configured to decrease the first strength to increase a level of image detail, and wherein the image processor circuit is further configured to increase the first strength to decrease the level of image detail.

6. The device of claim 4, wherein the first strength is less than the second strength and wherein the image processor circuit is further configured to subtract the enhanced image filtered through the second edge-preserving filter from the enhanced image filtered through the first edge-preserving filter.

7. The device of claim 1, wherein the image processor circuit is further configured to:
divide the portion into a plurality of subsections;
smooth at least one edge of each of the plurality of subsections;
increase the resolution of each for the plurality of subsections to form a plurality of enhanced subsections;
extract at least one edge of each of the plurality of enhanced subsections; and
combine the extracted at least one edge of each of the plurality of subsections or a derivation of the extracted at least one edge of each of the plurality of subsections with each of the plurality of enhanced subsections.

8. The device of claim 1, wherein the image processor circuit is further configured to smooth at least one edge of the enhanced image.

9. The device of claim 1, wherein the at least one edge comprises a set of contiguous pixels where an abrupt change in pixel values occurs.

10. The device of claim 1, wherein the color value of the at least one transition pixel is a transition between a first color value on a first side of the at least one edge and a second color value on a second side of the at least one edge.

11. The device of claim 1, wherein the brightness value of the at least one transition pixel is a transition between a first brightness value on a first side of the at least one edge and a second brightness value on a second side of the at least one edge.

12. The device of claim 1, wherein replacing the one or both of the color value and the brightness value of the least one transition pixel is based at least partly on a predetermined strength parameter representing an amount of transition pixels remaining in the portion of the image.

13. A method for image processing, comprising:
receiving at least a portion of an image from a memory circuit;
smoothing at least one edge of the portion of the image via replacing one or both of a color value and a brightness value of at least one transition pixel along the at least one edge;
increasing a resolution of the smoothed portion to form an enhanced image;
extracting at least one edge of the enhanced image; and
combining the extracted at least one edge or a derivation of the extracted at least one edge with the enhanced image.

14. The method of claim 13, further comprising adding white noise to the enhanced image.

15. The method of claim 13, further comprising increasing the resolution of the smoothed portion via at least one of a bicubic interpolation, a bilinear interpolation, a nearest neighbor interpolation, a spline interpolation, and a sinc interpolation.

16. The method of claim 13, further comprising filtering the enhanced image through a first edge-preserving filter having a first strength and a second edge-preserving filter having a second strength.

17. The method of claim 16, further comprising:
decreasing the strength of the first edge-preserving filter to increase a level of image detail; and
increasing the strength of the first edge-preserving filter to decrease the level of image detail.

18. The method of claim 16, further comprising subtracting the enhanced image filtered through the second edge-preserving filter from the enhanced image filtered through the first edge-preserving filter, wherein the first strength is less than the second strength.

19. The method of claim 13, further comprising:
dividing the portion into a plurality of subsections;
smoothing at least one edge of each of the plurality of subsections;
increasing the resolution of each for the plurality of subsections to form a plurality of enhanced subsections;
extracting at least one edge of each of the plurality of enhanced subsections; and
combining the extracted at least one edge of each of the plurality of subsections or a derivation of the extracted at least one edge of each of the plurality of subsections with each of the plurality of enhanced subsections.

20. The method of claim 13, further comprising smoothing at least one edge of the enhanced image.

21. The method of claim 13, wherein the at least one edge comprises a set of contiguous pixels where an abrupt change in pixel values occurs.

22. An apparatus for image processing, comprising:
means for storing an image;
means for receiving at least a portion of the image from the means for storing;
means for smoothing at least one edge of the portion of the image via replacing one or both of a color value and a brightness value of at least one transition pixel along the at least one edge;
means for increasing a resolution of the smoothed portion to obtain an enhanced image;
means for extracting at least one edge of the enhanced image; and
means for combining the extracted at least one edge or a derivation of the extracted at least one edge with the enhanced image.

23. The apparatus of claim 22, further comprising means for adding white noise to the resolution enhanced image.

24. The apparatus of claim 22, wherein the means for increasing comprises at least one of means for bicubic interpolation, means for bilinear interpolation, means for nearest neighbor interpolation, means for spline interpolation process, and means for sinc interpolation.

25. The apparatus of claim 22, further comprising means for filtering the enhanced image through a first edge-preserving filter having a first strength and a second edge-preserving filter having a second strength.

26. The apparatus of claim 25, further comprising:
means for decreasing the strength of the first edge-preserving filter to increase a level of image detail; and
means for increasing the strength of the first edge-preserving filter to decrease the level of image detail.

27. The apparatus of claim 25, wherein the first strength is less than the second strength and wherein the means for extracting further comprises means for subtracting the resolution enhanced image filtered through the second edge-preserving filter from the resolution enhanced image filtered through the first edge-preserving filter.

28. The apparatus of claim 22, further comprising means for smoothing at least one edge of the resolution enhanced image.

29. The apparatus of claim 22, wherein the at least one edge comprises a set of contiguous pixels where an abrupt change in pixel values occurs.

30. A non-transitory computer-readable storage medium having stored thereon instructions that, when executed, cause a processor of a device to:
receive at least a portion of an image;
smooth at least one edge of the portion of the image via replacing one or both of a color value and a brightness value of at least one transition pixel along the at least one edge;
increase a resolution of the smoothed portion to obtain an enhanced image;
extract at least one edge of the resolution enhanced image; and
combine the extracted at least one edge or a derivation of the extracted at least one edge with the resolution enhanced image.

31. The non-transitory computer-readable storage medium of claim 30, further comprising instructions that, when executed, cause the processor to increase the resolution of the smoothed portion via at least one of a bicubic interpolation, a bilinear interpolation, a nearest neighbor interpolation, a spline interpolation, and a sinc interpolation.

32. The non-transitory computer-readable storage medium of claim 30, further comprising instructions that, when executed, cause the processor to smooth at least one edge of the enhanced image.

33. The non-transitory computer-readable storage medium of claim 30, wherein the at least one edge comprises a set of contiguous pixels where an abrupt change in pixel values occurs.

* * * * *